ns Patent [19]

United States Patent [19]

Hestermann et al.

[11] 4,136,155

[45] Jan. 23, 1979

[54] PRODUCTION OF PHOSPHINE

[75] Inventors: Klaus Hestermann, Erftstadt Bliesheim; Gero Heymer, Erftstadt, both of Fed. Rep. of Germany

[73] Assignee: Hoechst Aktiengesellschaft, Frankfurt am Main, Fed. Rep. of Germany

[21] Appl. No.: 904,026

[22] Filed: May 8, 1978

[30] Foreign Application Priority Data

May 12, 1977 [DE] Fed. Rep. of Germany ....... 2721374

[51] Int. Cl.² ............................................. C01B 25/00
[52] U.S. Cl. .................................................... 423/299

[58] Field of Search ........................................ 423/299

[56] References Cited

U.S. PATENT DOCUMENTS 3,371,994   3/1968   Lowe et al. ........................ 423/299

*Primary Examiner*—O. R. Vertiz
*Assistant Examiner*—Wayne A. Langel
*Attorney, Agent, or Firm*—Connolly and Hutz

[57] ABSTRACT

Phosphine (hydrogen phosphide) is made by reacting gaseous yellow phosphorus with steam at temperatures of 280 to 400° C in the presence of ammonia in contact with a carbon catalyst.

9 Claims, No Drawings

PRODUCTION OF PHOSPHINE

This invention relates to a process for making phosphine ($PH_3$) by reacting phosphorus with water at elevated temperature.

It is known that liquid yellow phosphorus can be converted to finely divided red phosphorus and that the latter can then be reacted at temperatures higher than 250° C. with water to give phosphoric acid and phosphine (cf. German Patent Specification 1,219,911 und U.S. Pat. No. 3,371,994).

This process is not fully satisfactory in respect of the following points: Prior to the reaction, it is necessary to convert yellow to red phosphorus by an operation which in the end has adverse effects on the space-time yield which is as low as 3 g of $PH_3$ per liter per hour. A further disadvantage resides in the impossibility to effect the reaction in a customary metal reactor, e.g. a stainless steel reactor, which has to be replaced by a reactor made up of graphite or carbon, i.e. of materials which cannot be dimensioned and designed as it would be desirable.

A further process for making phosphine from yellow phosphorus and a sodium hydroxide solution in a water-alcohol mixture containing at least 70 volume % of alcohol has been described in U.S. Pat. No. 2,972,192. This reaction takes place at 50 to 70° C. and is indeed easy to carry out technically, but the conversion rate of phosphorus to phosphine is as low as 25% under optimum conditions, which is not satisfactory. The phosphorus balance portion is invariably converted to sodium hypophosphite. In other words, this process can be carried out under commercially attractive conditions in those cases only in which effective use can be made of the hypophosphite, which is the principal product, and its reaction products.

A further process has been disclosed in German Patent Specification 431,504, which teaches the skilled artisan that phosphoric acid and hydrogen are obtained by reacting phosphorus in vapor form with steam at temperatues of about 600° C. in contact with a carbon catalyst.

The object of the present invention is to provide a single step process permitting phosphine to be produced in high space-time yields by directly reacting yellow phosphorus with water.

In accordance with our present invention we now unexpectedly provide a process which comprises: reacting gaseous yellow phosphorus with steam at temperatures of 280 to 400° C., preferably 280 to 350° C., in the presence of ammonia in contact with a carbon catalyst with the resultant formation of phosphine having a purity of 90 to 99%. In accordance with the present invention, the phosphorus and steam should preferably be used in quantities corresponding to a molar ratio of $P_4 : H_2O$ of 1:0.1 to 1:10. It is also preferable to use the vaporous starting reactants in admixture with 0.1 to 95 volume % of ammonia. A further advantageous feature of the present process provides for the starting reactants to be contacted with the catalyst over a period of 0.1 to 100 seconds, more preferably 0.5 to 50 seconds. It is also good practice to mix the starting reactants in gas phase, to heat the resulting mixture to reaction temperature and to contact the mixture with the catalyst. Active carbon should preferably be used as the catalyst, more preferably active carbon having a BET-surface area of more than 10 $m^2/g$.

The reaction should conveniently be effected at atmospheric pressure or under the slight overpressure which is found to establish on passing the reactants through the reactor.

The reaction products coming from the reactor are worked up in known manner. More specifically, the gaseous reaction product coming from the reactor is scrubbed with an aqueous acid solution, e.g. a $H_3PO_4$ solution, so as to be freed from unreacted $NH_3$. The very same solution can be used for collecting phosphorus (coming from the reactor) therein; the phosphorus so collected is very clean and can readily be recycled. The gaseous material so scrubbed consists of desirable phosphine having a purity of 90 to 99%.

The following Examples illustrate the invention which, however, is not limited thereto.

EXAMPLE 1

2 mols/h of $P_4$ (248 g/h), 3 mols/h of $H_2O$ (54 g/h) corresponding to a 400% excess of $P_4$, based on the following equation (1): $2 P_4 + 12 H_2O \rightarrow 5 PH_3 + 3H_3PO_4$, and 3 mols/h of $NH_3$ (51 g/h) (corresponding to 37.5 volume %) were heated to 285° C. in a preheater, and the whole was then contacted over a period of 25 seconds at 285° C. and at atmospheric pressure with a fixed bed active carbon catalyst placed in a stainless steel reactor. The experiment was conducted over a period of 6 hours. The reaction products leaving the reactor contained $NH_3$ and gave an alkaline reaction. They were passed through a scrubbing cycle operated with dilute phosphoric acid. $NH_3$ in excess was sequestered; unreacted phosphorus was condensed and obtained in the form of colorless "white" phosphorus, which could directly be recycled. The gas coming from the scrubbing cycle contained 98 volume % of $PH_3$, 1.5 volume % of $H_2$ and 0.5 volume % of $N_2$. It was passed through two cooling traps cooled down to $-150°$ C. in which $PH_3$ was condensed and separated from $H_2$ and $N_2$. Altogether 240 g of $PH_3$ was isolated. This corresponded to a $PH_3$-yield of 94%, based on the quantity of water used in accordance with equation (1). 1488 g of $P_4$ was used of which 1020 g were recovered in the form of white phosphorus, in the scrubbing cycle. A further 115 g of phosphorus, which was obtained in the form of orthophosphates and condensed phosphates, was recovered by extracting the active carbon, which was used again as catalyst, with boiling water. A further 60 g of elemental phosphorus was found to adhere to the active carbon.

EXAMPLE 2

1 mol of $P_4$/h (124 g/h), 12 mols/h of $H_2O$ (216 g/h) (corresponding to a 200% excess of $H_2O$, based on equation (1) and 5 mols/h of $NH_3$ (85 g/h) (corresponding to 27.8 volume %) were contacted with the catalyst over a period of 40 seconds at 300° C. and at atmospheric pressure. The other conditions were as in Example 1. Elemental phosphorus could not be found to have been retained in the scrubbing cycle. The gas coming from the scrubbing cycle contained 92 volume % of $PH_3$, 6.5 volume % of $H_2$ and 1.5 volume % of $N_2$. 744 g of $P_4$ was used and 444 g of $PH_3$ was obtained. This corresponded to a $PH_3$-yield of 87%, based on equation (1).

EXAMPLE 3

2 mols/h of $P_4$ (248 g/h) and 3 mols of $H_2O$ (54 g/h) were admixed with 0.1 mol/h of $NH_3$ (1.7 g/h) (corresponding to 2 volume %) and the whole was contacted for 1 second at 350° C. and at atmospheric pressure with an active carbon catalyst placed in a glass reactor. The other conditions were as in Example 1. 96 volume % of $PH_3$ was obtained. This corresponded to a yield of 89% based on the $P_4$ used in accordance with equation (1).

We claim:

1. A process for making phosphine (hydrogen phosphide) by reacting phosphorus with water at elevated temperature, which comprises reacting gaseous yellow phosphorus with steam at temperatures of 280 to 400° C. in the presence of ammonia in contact with a carbon catalyst.

2. The process as claimed in claim 1, wherein the starting reactants are contacted with the catalyst in the reactor over a period of 0.1 to 100 seconds.

3. The process as claimed in claim 2, wherein the starting reactants are contacted with the catalyst in the reactor over a period of 0.5 to 50 seconds.

4. The process as claimed in claim 1, wherein active carbon is used as the catalyst.

5. The process as claimed in claim 4, wherein the active carbon has a BET-surface area of more than 10 $m^2/g$.

6. The process as claimed in claim 1, wherein the reaction is effected at temperatures of 280 to 350° C.

7. The process as claimed in claim 1, wherein the phosphorus and steam are used in quantities corresponding to a molar ratio of $P_4 : H_2O$ of 1:0.1 to 1:10.

8. The process as claimed in claim 1, wherein the vaporous starting reactants are used in admixture with 0.1 to 95 volume % of ammonia.

9. The process as claimed in claim 1, wherein the starting reactants are mixed in gas phase, the resulting mixture is heated to reaction temperature and then contacted with the catalyst.

* * * * *